Patented July 13, 1954

2,683,738

UNITED STATES PATENT OFFICE 2,683,738

β-CARBOXY-γ-(6-LOWER-ALKOXY-2-NAPHTHYL)-CAPROIC ACID

William S. Johnson, Madison, Wis., and Robert P. Graber, Westfield, N. J.

No Drawing. Original application July 23, 1949, Serial No. 106,494. Divided and this application August 3, 1951, Serial No. 240,272

2 Claims. (Cl. 260—520)

The present invention is directed to β-carboxy-γ-(6-lower-alkoxy-2-naphthyl)-caproic acid and lower alkyl esters thereof, and includes processes of preparing the same. The caproic acid product of the present invention is an intermediate in the synthesis of bisdehydrodoisynolic acid described in our application Serial No. 106,494, filed on July 23, 1949. The present application is a division of this application which is now matured into Patent No. 2,574,396, dated November 6, 1951.

The dehydro acid known chemically as 1-ethyl-2-methyl-7-hydroxy-1,2,3,4-tetrahydrophenanthrene-2-carboxylic acid, has attracted attention in the hormone field because it is one of the most potent estrogens known. In a series of brilliant studies Miescher, Heer, and Billeter obtained the dehydro acid both as a degradation product of natural equilenin and by total synthesis. Miescher, Helv. Chim. Acta. 27, 1727 (1944); Heer, Billeter, and Miescher, ibid. 28, 991, 1342 (1945). More recently Anner and Miescher announced an improved synthesis involving about ten steps from 1-aminonaphthalene-6-sulfonic acid (Cleve's acid) to the methyl ether. Anner and Miescher, Helv. Chim. Acta. 29, 586 (1946).

The process of the present invention comprises the condensation of di-lower-alkyl succinate with 2-propionyl-6-methoxynaphthalene, and catalytic hydrogenation of the resulting condensation product to form β-carboxy-γ-(6-methoxy-2-naphthyl)-caproic acid.

*2-Propionyl-6-methoxynaphthalene.*—A solution of 224 g. (1.68 moles) of anhydrous aluminum chloride in one liter of freshly distilled nitrobenzene is cooled to 0–2° C. and a solution of 212.2 g. (1.343 moles) of β-methoxynaphthalene, prepared from β-naphthol by conventional methods, Stork, J. Am. Chem. Soc., 69, 576 (1947), in 336 cc. of nitrobenzene is added dropwise with cooling and stirring. The resulting solution is further cooled to —3° C. and 143 g. (1.54 moles) of propionyl chloride added dropwise. The reaction mixture is then stored in ice for about 96 hours, after which it is decomposed by pouring onto 4 kg. of ice and 450 cc. of concentrated hydrochloric acid. The nitrobenzene is removed by steam distillation of the total mixture and the organic material, obtained by extraction with benzene, is distilled to give a light yellow distillate B. P. 145–162° C. at 0.05–0.06 mm., which crystallizes to a solid M. P. 97.5–107° C. One recrystallization from methanol gives the desired product with a melting point of about 110.5–111.5° C. Haworth and Sheldrick, J. Chem. Soc., 864 (1934).

*Unsaturated half esters.*—The condensation of the 2-propionyl-6-methoxynaphthalene with diethyl succinate is carried out as follows. A solution of potassium tert-butoxide is first prepared by dissolving 42.5 g. (1.09 moles) of potassium in 1100 cc. of sodium-dried tert.-butyl alcohol. To this solution 244 g. (1.40 moles) of diethyl succinate and 201.5 g. (0.94 mole) of the 2-propionyl-6-methoxynaphthalene prepared as above is added rapidly. The mixture is heated under reflux in an atmosphere of nitrogen for about forty minutes, cooled, and 610 cc. of 2 N hydrochloric acid added. After removal of most of the tert.-butyl alcohol in vacuo, the organic material is extracted with ether. The ether extract is washed thoroughly with water and the acidic material extracted with 5% sodium carbonate solution. Six 200 cc. portions of the sodium carbonate solution suffices to remove the major portion of the crude half ester mixture, which is then isolated by acidification of the sodium carbonate solution followed by extraction with ether. The ether extract is dried over sodium sulfate, and the ether removed by evaporation to give the desired product as a viscous yellow-brown oil.

*β-Carboxy-γ-(6-methoxy-2-naphthyl)-caproic acid.*—The hydrogenation of the crude half-ester mixture is carried out as follows. About 258.7 g. of the oily unsaturated half-ester mixture is hydrogenated in the presence of about 3 g. of platinum oxide in 360 cc. of ethanol using a Parr shaker apparatus and a starting pressure of about 32 lbs. After about nine hours the absorption of the hydrogen ceases. The mixture is filtered to remove the catalyst and the solvent removed in vacuo to give a light reddish-brown oily product. To this material is added 1800 cc. of 10 per cent sodium hydroxide solution and the mixture heated on a steam bath with stirring. After about twenty minutes the oily mixture completely dissolves and in about twenty-five minutes insoluble crystalline sodium salts begin to separate. The mixture is allowed to stand for about five hours and is then cooled and filtered.

The filtrate resulting from above operation is next acidified with dilute hydrochloric acid. A light brown oily mixture of acids is obtained which after separation from the aqueous mixture and crystallization from ethyl acetate-petroleum ether (boiling range 60–68° C.) gives the desired product as light buff-colored needles with a melting point of about 163–165° C.

Various derivatives of the products described above may be prepared by standard procedures available in the art. Di-lower-alkyl esters and ethers (ethyl, propyl, tert. butyl, etc.), for example, may be prepared by various procedures known in the art.

The novel synthesis of the present invention employs as its starting material β-naphthol, a readily available and relatively inexpensive chemical.

It will be understood that the above detailed examples are for illustrative purposes only. Various modifications falling within the scope of the invention will be apparent to those skilled in the art.

We claim:

1. A product selected from the group consisting of β-carboxy-γ-(6-lower-alkoxy-2-naphthyl)-caproic acid and lower alkyl esters thereof.

2. The product, β-carboxy-γ-(6-methoxy-2-naphthyl)-caproic acid.

References Cited in the file of this patent

UNITED STATES PATENTS

| Number | Name | Date |
| --- | --- | --- |
| 2,459,949 | Miescher et al. | Jan. 25, 1949 |
| 2,574,396 | Johnson et al. | Nov. 6, 1951 |

OTHER REFERENCES

Johnson et al., J. Amer. Chem. Soc., vol. 70, pages 2612–13.